INVENTORS
Herbert Merker
Kurt Loos
BY

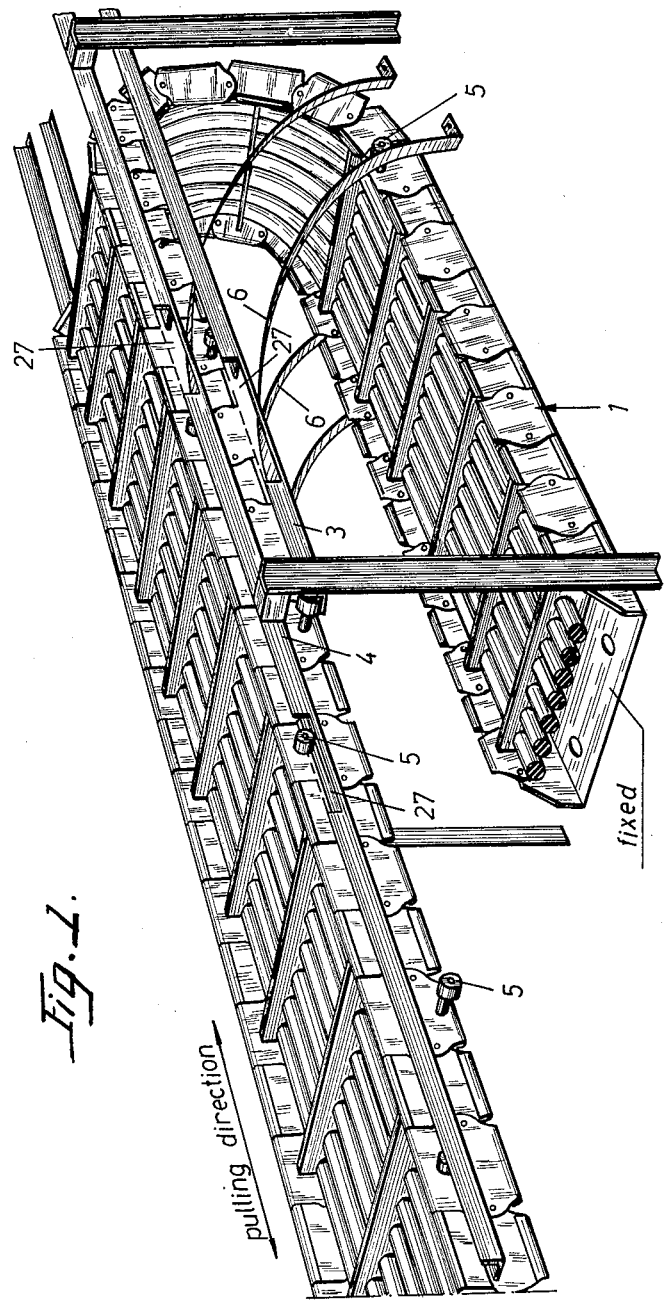

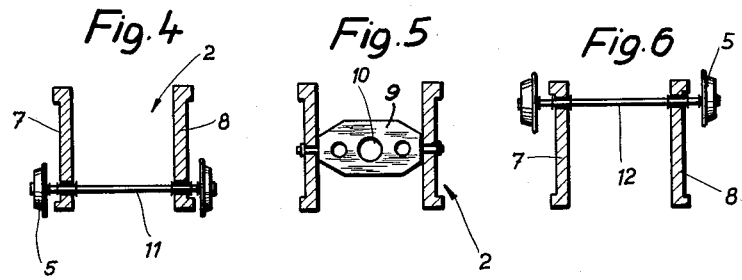
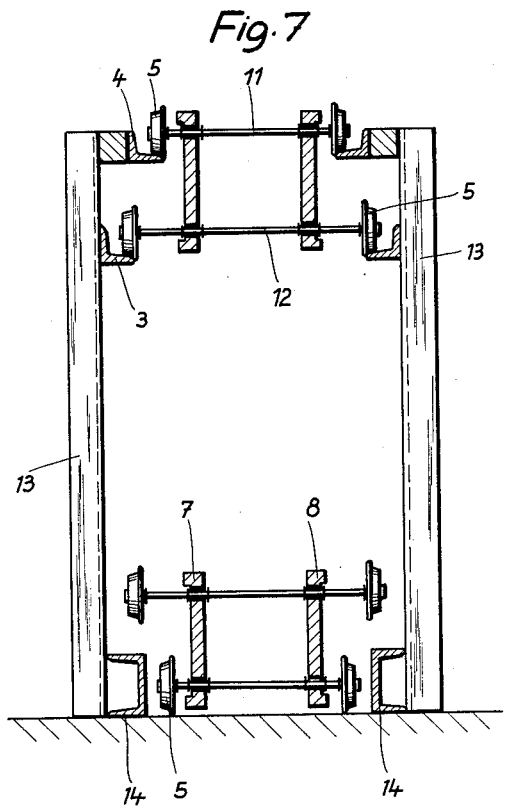

United States Patent Office 3,157,376
Patented Nov. 17, 1964

3,157,376
ARRANGEMENT FOR FEEDING CONSUMER MEANS THROUGH CONVEYING MEANS TO PARTS MOVABLE ON TRACKS
Herbert Merker, Siegen, Westphalia, and Kurt Loos, Dreistiefenbach, Germany, assignors to Kabelschlepp G.m.b.H., Siegen, Westphalia, Germany
Filed Oct. 27, 1961, Ser. No. 148,145
Claims priority, application Germany Oct. 29, 1960
12 Claims. (Cl. 248—49)

The present invention relates to a self-supporting link chain with one or more continuous inner chambers for receiving, by means of said chain, conveying means, such as cables, hoses and the like, which are protected toward the outside, the links of said chain permitting only a limited tilting angle relative to each other while the magnitude of such angle corresponds to the permissible bending radius of the respective most sensitive conveying means to be supported by the chain.

The chains have one end stationary and the other attached to a movable carriage and from these ends horizontal reaches of the chain extend and are connected by a curved portion. The lower reach rests on a ground surface and the upper reach is supported on track means.

The construction of the chain will determine and limit the cantilever or free carrying portion thereof and thus, also, the distance by which a consumer to be supplied, may move.

It has already been suggested to support the free-hanging upper reach portion of a chain of the type involved by rollers which either move with the chain or are fixedly arranged. In the last-mentioned instance, the free-carrying chain portion is supported by fixedly arranged rollers.

An arrangement has also become known according to which both reaches of the chain are horizontal and are movable on two parallel tracks which are arranged adjacent to each other in an approximately horizontal plane, the medium distance between said tracks corresponding to the smallest diameter of curvature of the chain. In this instance, spaced portions of the chain are provided with rollers.

The heretofore known supporting arrangements are, in part, rather expensive and relatively complicated, whereas the structure with fixedly arranged rollers permits a limited movement only, which corresponds substantially to twice the length of the non-supported chain. If, however, chains are employed which are self-supporting, a chain supporting carriage becomes necessary, which further increases the cost of such arrangement.

It is, therefore, an object of the present invention to provide a support for self-supporting feeding chains, which will overcome the above-mentioned drawbacks.

It is a further object of this invention to provide a support for self-supporting feeding chains, which is of simple structure and relatively low weight, and permits the employment of such chains in any desired length of displacement of the consumer.

These and other objects and advantages of the invention will appear more clearly from the following specification in connection with the accompanying drawings, in which:

FIG. 1 represents an isometric view of a part of an installation employing a link chain system according to the present invention.

FIGURE 4 is a section along the line IV—IV of FIGURE 3.

FIGURE 5 is a section along the line V—V of FIGURE 3.

FIGURE 6 is a section along the line VI—VI of FIGURE 3.

FIGURE 7 is a cross-section through the upper and lower chain portion with roller means pertaining thereto.

Figure 1A:
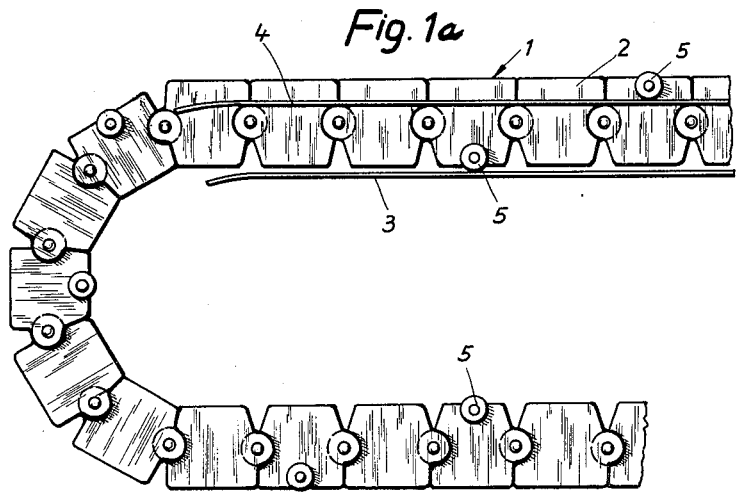
FIGURE 1a is a partial side view of a chain link the upper section of which is supported by two superimposed pairs of supporting rails vertically spaced from each other.

The invention is characterized primarily in that, for purposes of supporting the link chains, there are laterally thereof provided supporting rails and supporting rollers or the like, which cooperate with each other. The supporting rails have individual cutouts for permitting the passage of the supporting rollers at the respective deviating station of the chains. As a result thereof, it will be appreciated that the upper reach of the chain will be supported practically in any position by simple means, while being able to bend off downwardly in an unimpeded manner at the deviating portions of the chain, i.e. those portions where the supporting rollers for the chain links move from the upper section of the chain to the lower section and vice versa. It will be appreciated that the deviating portions change their locations in conformity with the stroke of displacement of the consumer.

According to a practical embodiment of the invention, the supporting rollers are arranged, for instance, on the link chain, whereas the horizontally extending supporting rails are connected to lateral supports or to a protective box for the chain. The supporting rails are located only within the range of the upper or taut section of the link chain because the lower or slack portion of the chain rests on the ground and cannot carry out any axial movements.

Adjacent the cutouts of said supporting rails or at the ends thereof there are provided inclined running-up sections for the supporting rollers which are designed in conformity with the paths of the supporting rollers when deviating the link chain. These paths or tracks correspond to an ellipse sector the smaller axis of which is determined by the distance between the upper and lower chain portions. In order to obtain a particularly good support of the chain links within the range of the upper or taut section of the chain, the supporting rollers are arranged in pairs in two superimposed planes and are offset with regard to each other while cooperating with correspondingly arranged supporting rails. Thus, supporting roller pairs which are adjacent the inner side of the arrangement have a wider gauge than the supporting roller pairs on the outside, so that at the deviating station of the chain, the upper supporting roller pairs will be able unimpededly to be passed through between the correspondingly wider spaced lower supporting rails.

Inasmuch as the supporting rails serve only for improving the supporting ability of the self-supporting link chain, they do not have to be provided in a continuous manner. It will, rather, suffice if they are arranged at greater distances corresponding approximately to the carrying ability of the chain. Preferably, a lower roller pair with larger gauge and an upper roller pair with smaller gauge are provided in direct proximity.

It is also possible to provide the cutout supporting rails on the link chain, whereas the supporting rollers are arranged on the lateral supports or the protective box for the link chain. In this instance, only a few roller pairs are required, which are spaced from each other in conformity with the carrying ability of the self-supporting link chain, whereas on the same links of the chain, supporting rails must be provided.

With all embodiments described and designed according to the present invention, the supporting rollers are, with regard to the openings or cutouts of the supporting rails, so designed that at no time will all rollers at the same time be above an opening or cutout, because, in such an instance, the carrying ability of the self-supporting chain would be exceeded. If, however, the individual rolls pass over the cutouts or openings in the supporting rails ahead of the deviating station, the individual rollers will, in view of the self-supporting property of the link chain, be able not to roll into such opening or cutout. This is possible only at the actual deviating station.

Figure 2:
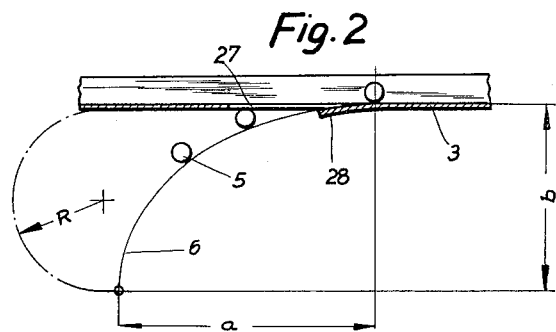
FIGURE 2 is a diagrammatic illustration of the path of movement of a supporting roller from the plane of the lower or slack chain section to its corresponding supporting rail.
Figure 3:
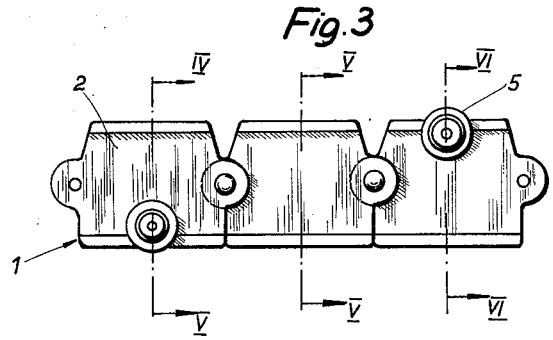
FIGURE 3 illustrates a cutout portion of a link chain according to the invention but on a larger scale than that of FIGURE 1.
Figure 8:
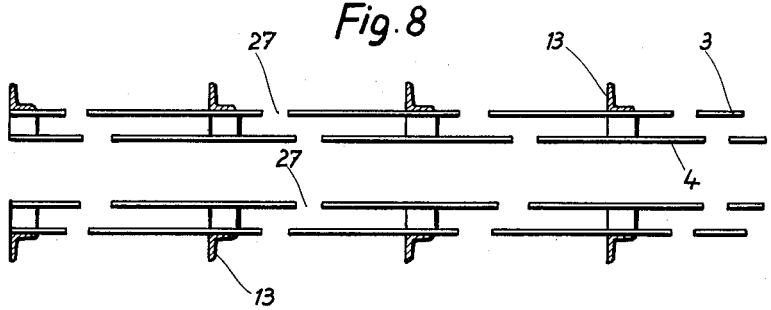
FIGURE 8 is a top view of the supporting rails diagrammatically showing the arrangement thereof and the cutouts associated therewith.
Figure 9:
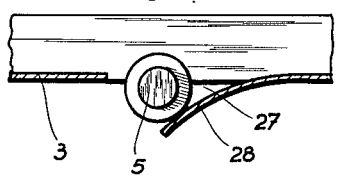
FIGURE 9 is a side view of a cutout of a supporting rail on a larger scale than that of FIGURE 8.

Referring now to the drawings in detail, the self-supporting chain, generally at 1, shown in FIGS. 1 and 1a comprises individual chain links 2 which are linked to each other. Within the range of the upper reach of the chain section there are provided supporting rails 3 and 4 on which the chain rests by means of supporting rollers 5. At the deviating portions of the link chains, the supporting rollers 5 move along a path 6 having the contour of an ellipse sector rather than the contour of a circular path with the radius R (FIG. 2) as might be assumed when looking at the bend of the chain in FIGS. 1 and 1a. The small axis b of the said ellipse sector shaped path corresponds to the distance between the roller on the taut and the slack chain section. The right end of the lower reach of the chain in FIG. 1 is fixed while the right end of the upper reach is attached to a movable member.

The individual chain elements 2 comprise lateral plates 7 and 8 which may be interconnected by means of webs 9. These webs 9 determine the width of the chain links and are provided with cutouts 10 in which the feeding means are guided and held. These webs may, if desired, be designed as consisting of one or more parts. The individual chain links 2 have laterally thereof arranged supporting rollers 5 which expediently are connected with each other through the intervention of a common axle 11 or 12 extending through the lateral plates 7 and 8.

As will be evident from the above and in particular with reference to FIG. 1, the stationary horizontal lower reach of the chain rests on the ground and the upper movable reach is supported by the upper rails 3 and 4 by means of the rollers 5. FIG. 1 also shows the curved portion interconnecting the upper and lower reaches of the chain. FIG. 1a also clearly shows that the supporting rollers 5 are spaced and offset with regard to each other and also indicates the manner in which the rollers engage the tracks 6 where the supporting rollers for the chain links move from the lower chain section to the upper chain section and vice versa.

In order to assure that the link chain may flex properly, the supporting rails 3, 4 have to be provided with cutouts 27 (FIGS. 1 and 2) for the supporting rollers to pass therethrough. These cutouts 27 are arranged in conformity with the spacing of the supporting rollers so that said supporting rollers will be able, at predetermined points, to pass through the supporting rails. Preferably, the supporting rails will have bent-off portions 28 (FIG. 2) which are continuations of the tracks 6.

According to a particularly advantageous embodiment of the invention as illustrated in FIG. 7, the supporting rollers move on separate supporting rails 3 and 4. With this embodiment, the lower supporting rails 3 have a wider gauge than the upper supporting rails 4 so that the supporting rollers 5 are connected to each other by means of a longer axle 12 than the upper supporting rollers. The supporting rails 3 and 4 are connected to lateral supports 13. Instead of the supports 13, there may also be provided a protective box for the link chain 1 while the supporting rails are correspondingly connected to the inner wall of such protective box. The lower reach of the chain preferably is supported by the ground, while the plates 7 and 8 do not touch the ground inasmuch as the rims of the rollers 5 protrude somewhat beyond said plates. Arranged at the lower end of supports 13 are longitudinally extending structural irons 14 which establish a connection between the individual supports and at the same time serve for guiding the lower reach of the chain.

Figure 10:
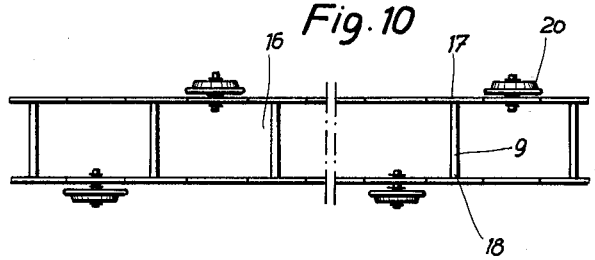
FIGURE 10 is a top view of a modified chain system.
Figure 11:
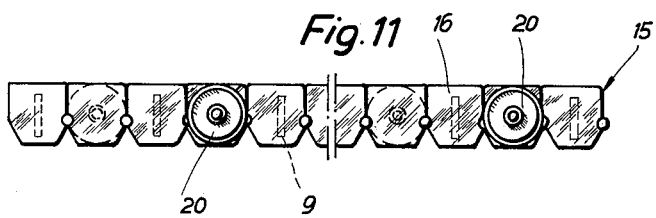
FIGURE 11 is a side view of the arrangement of FIGURE 10.
Figure 12:
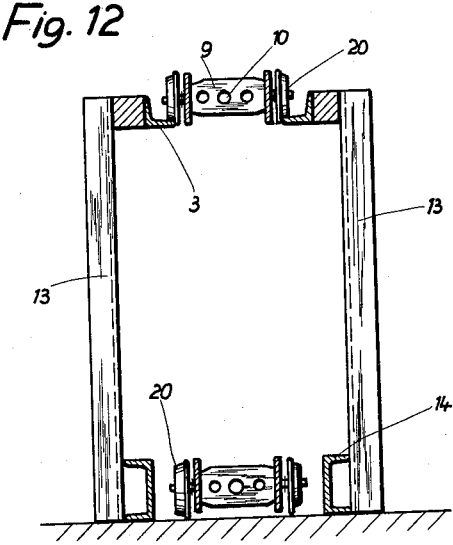
FIGURE 12 is a cross-section through the chain of FIGURES 10 and 11 and shows the chain in working position.
Figure 13:
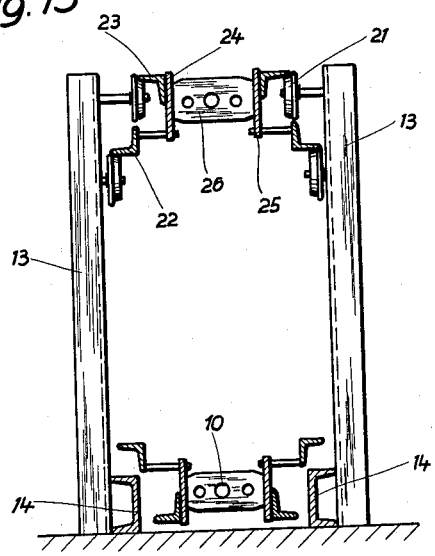
FIGURE 13 is a cross-section through a further embodiment of the invention, somewhat similar to that of FIGURE 12.

According to the embodiment illustrated in FIGS. 10 to 12, the self-supporting chain 15 is likewise composed of individual links 16 the plates 17 and 18 of which are interconnected through webs 19 so that they are spaced from each other by a certain distance. The individual links 16 have, in the central portion of the plates, arranged thereon large supporting rollers 20 which are uni-laterally supported and offset with regard to each other so that the supporting rollers may be evenly distributed over the entire length of the chain.

Also with this embodiment, the webs 19 are provided with cutouts 10 for the feeding means. However, in this instance, one pair of supporting rails 3 only is required which, in its turn, is held by lateral supports 13 or the like. The lower end of these supports is likewise provided with structural irons 14 serving at the same time for the lateral guidance of the chain.

According to still another embodiment of the invention, the supporting rollers 21 are connected to the lateral supports 13 or the like, whereas the supporting rails 22 and 23 are arranged on the individual chain links. The chain links are composed of the lateral plates 24 and 25 and are connected to each other through webs 26. The rollers 21 arranged with different gauge are, of course, also in this instance offset with regard to each other on individual supports 13.

With the arrangement having a plurality of supporting rails and supporting roller pairs arranged in different planes, no particular tolerances as to the distance between the rails are to be maintained because, generally, it is sufficient when the support is effected through the intervention of a pair of rollers which rests on one supporting roll pair.

It is, of course, to be understood that the present invention is, by no means, limited to the particular constructions shown in the drawings, but also comprises any modifications within the scope of the appended claims.

What we claim is:

1. A link chain system for supporting elongated flexible conveying means such as flexible conduit means, which includes: a link chain having an upper chain portion and a lower chain portion and an arcuate interconnecting portion extending between said upper and lower portions, said link chain also having means for receiving and supporting said conveying means, first supporting means for the chain in the form of spaced supporting rollers, and second supporting means for the chain in the form of supporting rails for supporting engagement with said first supporting means, said second supporting means being provided with openings therethrough so spaced as to permit said first supporting means to pass through said second supporting means where the chain links move from the lower chain portion around said arcuate portion to the upper chain portion and vice versa, one of said first and second supporting means being carried by said chain for movement therewith and projecting laterally therefrom, and the other one of said first and second supporting means being arranged stationarily and being laterally spaced to receive the chain.

2. A link chain system for supporting elongated flexible conveying means such as flexible conduit means, which includes: a link chain having an upper movable chain portion and a lower stationary chain portion and an arcuate interconnecting portion extending between said upper and lower portions, said link chain also having means for receiving and supporting said conveying means, a plurality of supporting rollers mounted in spaced relation on said link chain for movement therewith and projecting laterally therefrom, and supporting rail means stationarily arranged laterally of the upper portion of said link chain for engaging and supporting said rollers, said supporting rail means being provided with longitudinally spaced openings therethrough for permitting said rollers to pass through said rail means where the chain links move from the lower chain portion to the upper chain portion and from the upper chain portion to the lower chain portion.

3. An arrangement according to claim 2, which includes supporting frame means supporting said rail means.

4. An arrangement according to claim 2, which includes protective guard means arranged stationarily and extending at least partially around said link chain and supporting said rail means.

5. A link chain system for supporting elongated flexible conveying means such as flexible conduit means, which includes: a link chain having an upper movable chain portion and a lower stationary chain portion and an arcuate interconnecting portion extending between said upper and lower portions, said link chain also having means for receiving and supporting said conveying means, a plurality of supporting rollers mounted in longitudinally spaced relation on said link chain for movement therewith, and supporting rail means arranged stationarily and within the range of the upper chain portion only for supporting engagement with said supporting rollers, said supporting rail means being provided with openings therethrough spaced so as to permit said rollers to pass through said rail means where the said rollers move from the lower chain portion to the upper chain portion and from the upper chain portion to the lower chain portion.

6. A link chain system for supporting elongated flexible covneying means such as flexible conduit means, which includes: a link chain having an upper movable chain portion and a lower stationary chain portion and an arcuate interconnecting portion extending between said upper and lower portions, said link chain also having means for receiving and supporting said conveying means, a plurality of supporting rollers mounted in longitudinally spaced relation on said link chain for movement therewith, and supporting rail means stationarily arranged laterally of the upper portion of said link chain for supporting engagement with said rollers, said supporting rail means being provided with openings therethrough spaced so as to permit said rollers to pass through said rail means where the said rollers move from the lower chain portion to the upper chain portion and from the upper chain portion to the lower chain portion, said rail means having its end portions and also portions at said openings inclined downwardly for facilitating the movement of said rollers onto said rail means, said inclined portions following the contour of an ellipse.

7. A link chain system for supporting elongated flexible conveying means such as flexible conduit means, which includes: a link chain having an upper movable chain portion and a lower stationary chain portion and an arcuate interconnecting portion extending between said upper and lower portions, said link chain also having means for receiving and supporting said conveying means, a plurality of roller means mounted in longitudinally spaced relation on said chain links for movement therewith, said roller means being arranged in two horizontal planes extending in the longitudinal direction of said link chain in spaced relationship to each other with the roller means in one plane offset laterally with regard to the roller means in the other plane, and a pair of supporting rail means arranged in vertically spaced relationship to each other adjacent the upper portion of the chain for supporting engagement with the roller means of the respective upper chain portion, said rail means being provided with openings therethrough for permitting said roller means to pass through said rail means where the roller means move from the lower chain portion to the upper chain portion and from the upper chain portion to the lower chain portion.

8. An arrangement according to claim 7, in which the roller means in said two planes are arranged in pairs, and in which the roller means which engage the lower one of said rail means have a wider gauge than the roller means that engage the other of said rail means.

9. A link chain system for supporting elongated flexible conveying means such as flexible conduit means, which includes: a link chain having an upper movable chain portion and a lower stationary chain portion and an arcuate interconnecting portion extending between said upper and lower portions, said link chain also having means for receiving and supporting said conveying means, a plurality of supporting rollers mounted in longitudinally spaced relation on the links of said chain and respectively provided with a rim having a diameter in excess of the height of the individual chain links, and rail means adjacent the upper portion of the chain for supporting engagement with the supporting rollers of the respective upper chain portion, said rail means being provided with openings so spaced as to permit said roller means to pass through said rail means where the said roller means move from the lower chain portion to the upper chain portion and from the upper chain portion to the lower chain portion.

10. An arrangement according to claim 7, in which the link chain comprises two substantially parallel rows of chain links each carrying some of said roller means, said roller means being individually supported by the respective chain links with the roller means in one row of chain links offset longitudinally with regard to the roller means in the other row of chain links.

11. A link chain system for supporting elongated flexible conveying means such as flexible conduit means, which includes: a link chain having an upper movable chain portion and a lower stationary chain portion and an arcuate interconnecting portion extending between said upper and lower portions, said link chain also having means for receiving and supporting said conveying means, supporting roller means stationarily arranged laterally the said upper portion of said link chain, and supporting rail means monuted on the links of said link chain for supporting engagement with said roller means, said rail means being provided with openings so spaced as to allow the passage of said roller means therethrough where the said rail means together with the chain links move from the upper chain portion to the lower chain portion and from the lower chain portion to the upper chain portion.

12. An arrangement according to claim 1, in which said first and second supporting means are arranged relative to each other in such a way that at least some of said first supporting means will be outside the limits of said openings when other ones of said first supporting means are within the limits of said openings.

References Cited in the file of this patent

UNITED STATES PATENTS

| | | |
|---|---|---|
| 1,054,305 | Mueller | Feb. 25, 1913 |
| 2,864,907 | Waninger | Dec. 16, 1958 |
| 2,975,807 | Waninger | Mar. 21, 1961 |

FOREIGN PATENTS

| | | |
|---|---|---|
| 227,425 | Australia | Mar. 28, 1960 |